United States Patent
Fifield et al.

(10) Patent No.: US 8,930,729 B1
(45) Date of Patent: Jan. 6, 2015

(54) ENHANCED UTILIZATION OF POWER OVER ETHERNET

(75) Inventors: David Fifield, San Jose, CA (US); Dennis Wu, San Jose, CA (US)

(73) Assignee: Aerohive Networks, Inc., Sunnyvale, CA (US)

( * ) Notice: Subject to any disclaimer, the term of this patent is extended or adjusted under 35 U.S.C. 154(b) by 1217 days.

(21) Appl. No.: 12/345,629

(22) Filed: Dec. 29, 2008

Related U.S. Application Data

(60) Provisional application No. 61/017,390, filed on Dec. 28, 2007.

(51) Int. Cl.
- *G06F 1/26* (2006.01)
- *G06F 1/18* (2006.01)
- *H04L 12/24* (2006.01)

(52) U.S. Cl.
CPC ... *G06F 1/26* (2013.01); *G06F 1/18* (2013.01); *Y02B 60/30* (2013.01); *Y02B 60/44* (2013.01); *H04L 12/2434* (2013.01)
USPC ............ 713/310; 713/300; 713/324; 713/340

(58) Field of Classification Search
CPC ............... G06F 1/26; G06F 1/32; G06F 1/18; Y02B 60/30; Y02B 60/44; H04L 12/2434; H04L 12/28
USPC ............. 324/713, 691; 702/57; 713/1, 2, 100, 713/300, 310, 320–324, 330, 340
See application file for complete search history.

(56) References Cited

U.S. PATENT DOCUMENTS

| | | | | |
|---|---|---|---|---|
| 7,404,091 | B1 * | 7/2008 | Gere | 713/300 |
| 7,849,333 | B2 * | 12/2010 | Schindler | 713/300 |
| 2007/0064922 | A1 * | 3/2007 | Schindler | 379/395.01 |
| 2008/0129118 | A1 * | 6/2008 | Diab | 307/35 |
| 2008/0250261 | A1 * | 10/2008 | Nguyen et al. | 713/340 |
| 2008/0252307 | A1 * | 10/2008 | Schindler | 324/713 |
| 2008/0315682 | A1 * | 12/2008 | Hussain | 307/2 |

* cited by examiner

*Primary Examiner* — Fahmida Rahman
(74) *Attorney, Agent, or Firm* — Sheppard, Mullin, Richter & Hampton LLP

(57) ABSTRACT

An embodiment of the invention includes a circuit to determine the power lost between a network device and a network power supply. Using this determination, an embodiment of the network device may increase its power consumption by an amount equal to the difference between the actual cable power loss and the worst-case cable power loss. This allows the network device to draw more power than allowed by network power standards without triggering the power-limiting circuitry of the network power source or overloading the network power device. The network device can determine an operating configuration that utilizes this additional power consumption to improve performance. The network device may also determine the existence of network power device or cable fault conditions, and adjust its operating configuration as necessary. Operating configurations can include enabling additional or more powerful wired or wireless network interfaces.

21 Claims, 4 Drawing Sheets

ENHANCED UTILIZATION OF POWER OVER ETHERNET

BACKGROUND

Many network-connected devices are capable of receiving electrical power necessary for their operations via their data communications connections with a network. For example, power over Ethernet specifications such as IEEE 802.3af and IEEE 802.3at allow a device to receive power from a network, in addition to data communications, via one or more Ethernet ports. This allows devices to be connected to the network and powered using the same cable. Because these devices do not need a separate connection with a power source, the costs and infrastructure required for installing and maintaining these devices are minimized.

Power over Ethernet (and generally other network power systems) typically include two classes of devices. Power sourcing equipment (PSE) supply electrical power to the network powered devices (PD), which receive electrical power from the network. Devices may act as PSE or PD independently of their role in sending or receiving data. Any type of device connected with the network and a power supply may act as a PSE and any type of device connected with the network may act as a PD to receive some or all of its required electrical power via the network.

The electrical power supplied by a PSE is typically limited to prevent overloading of PSE devices and overheating of the network cable. For example, IEEE 802.3af specification compliant PSE ports (on Ethernet switches and the like) provide for 12.95 W maximum usable power at the secondary side of a PD circuit (at the client product). This specification includes allowances for the PSE output voltage being at the low end of the specification and the cable between the PSE and PD being the maximum length of 100 m of CAT-3 wire with worst case heating loss (due to cable DC resistance).

Furthermore, most PD devices are designed to limit their power consumption to the maximum power allowed by the specification. For example, PD's following the IEEE 802.3af standard limit their power consumption to less than the 12.95 W maximum allowed by the standard.

However, most PSE ports put out a voltage at or near the high end of the specification and the cable between the PSE and PD is usually nowhere near 100 m long, and is most likely to be CAT-5 or CAT-6 wire, which has much lower loss per unit length than CAT-3.

SUMMARY

An embodiment of the invention includes a circuit to measure the actual cable resistance, hence power loss, between a PD and a PSE. Using this measurement, an embodiment of a PD may increase its power consumption by an amount equal to the difference between the actual cable power loss and the theoretical worst-case cable power loss. The total power drawn by the PD is still within the specification allowance for power consumption including worst case power loss, so the power-limiting circuitry of the PSE is not triggered and the PSE is not overloaded. For example, under the IEEE 802.3af standard, an embodiment of a PD may utilize up to an additional 2.45 W of electrical power (if there is no cable power loss) before the PSE would "notice" the excess power consumption and attempt to limit the power supplied. In typical network installations, the actual cable power loss is minimal and the PD may utilize a substantial portion of this additional power, such as the theoretical 2.45 W of additional electrical power available under the IEEE 802.3af standard, without triggering a PSE's power-limiting circuit or overloading the PSE.

In a further embodiment, a PSE load measuring technique provides cable resistance, hence power loss, information to the main processor (CPU) of a PD. When applied to a device with two Ethernet ports connected to two separate PSE devices, this circuitry can be duplicated to provide the PD's CPU with information about the power available on both the Ethernet ports, providing for example up to a maximum of 30.9 W of power (with zero cable heating loss) for devices using the IEEE 802.3af standard.

One advantage of an embodiment of the invention is that it allows PD's which take more than the 12.95 W maximum to exist and operate normally on ordinary IEEE802.3af PSE ports. This potentially allows a whole new class of IEEE802.11n enterprise access point designs to be produced and deployed.

Another advantage of an embodiment of the invention is that a PD can determine the existence of certain PSE faults, or faulty installed cable plant, if its measurements return the result that there is less power available than the IEEE802.3af minimum.

BRIEF DESCRIPTION OF THE DRAWINGS

The invention will be described with reference to the drawings, in which.

DETAILED DESCRIPTION

Figure 1:
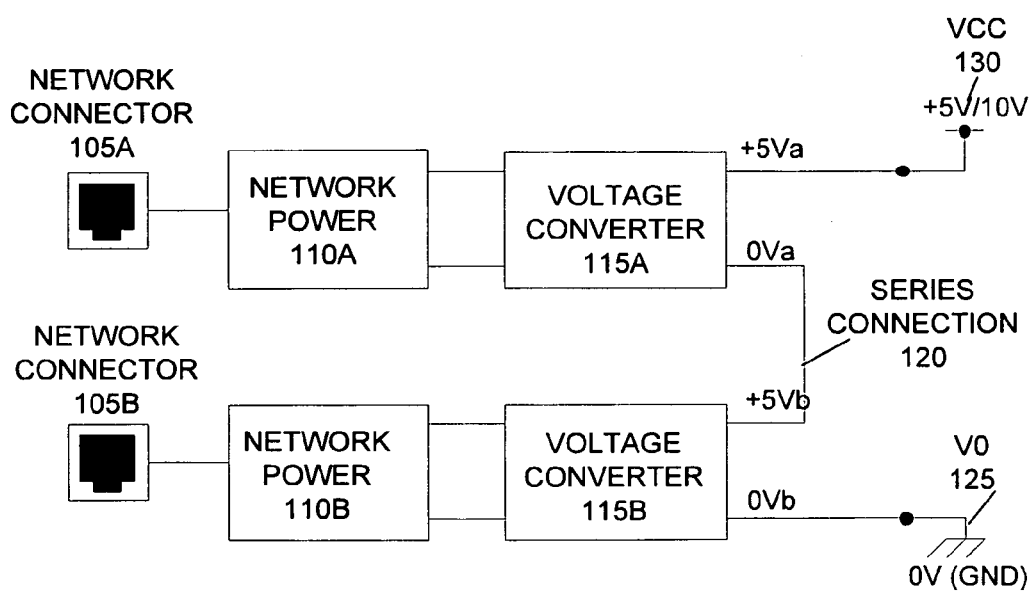
FIG. 1 illustrates a stacked network power system according to an embodiment of the invention.

FIG. 1 illustrates a stacked network power system 100 according to an embodiment of the invention. Stacked power network power system 100 includes a pair of network communications ports 105*a* and 105*b*, which may be Ethernet ports or any other type of wired data communication connection. Stacked network power system 100 allows a device to receive electrical power via the network communications ports 105, in addition to sending and receiving data. Network communications ports are connected with a network communications interface for sending and receiving data; however, the network interface is omitted from FIGS. 1 to 4 for clarity.

The stacked network power system 100 includes network power circuits 110*a* and 110*b*, connected with network communication ports 105*a* and 105*b*, respectively. Network power circuits 110*a* and 110*b* are adapted to extract electrical power from wired network connections. In an embodiment, network power circuits 110 include control and signaling features for a network power standard, such as IEEE 802.3af, for extracting electrical power from a wired network connection.

In many cases, the electrical power provided via a network connection is at a different voltage than that required by the receiving device. Thus, one or more power converters 115 change the voltage provided by network power circuits 110 to one or more voltages required by the receiving device. In an embodiment, power converters 115*a* and 115*b* convert the electrical power provided by network power circuits 110*a* and 110*b* respectively. In an embodiment, power converters 115 are isolated switched-mode isolated DC to DC power converters adapted to change the voltage from each network power circuits (for example 48 volts) to a voltage usable by the receiving device (for example 5 volts).

Because an embodiment of the power converters 115 are isolated, they may be connected in series via connection 120. This allows the stacked network power system 100 to provide a higher voltage, such as 10 volts, when both network power circuits 110 and power converters 115 are connected with the network and operating correctly, and a lower voltage, such as 5 volts, when one of the network power circuits 110 or power converters 115 is malfunctioning or is disconnected from the network.

In further embodiments, power converters 115 may provide two or more output voltages to meet the requirements of different portions of the receiving device. In an alternate embodiment, low and high supply voltage outputs 125 and 130 are connected with an additional power converter to provide one or more additional supply voltages, such as converting a 5 or 10 volts supplied by outputs 125 and 130 to 3.3 volts, 2.5 volts, 1.8 volts, 1.2 volts, 1.0 volts, or any other standard or non-standard power supply requirement.

An embodiment of the invention includes network power circuits adapted to measure the resistance of the cable, hence power loss, between the network power receiving device (PD) and the power sourcing equipment (PSE), which provides electrical power to devices via a wired network connection. Using the determination of cable power loss for one or more connected network cables, an embodiment of the network power circuit can adjust its power consumption to either draw additional electrical power from its network connections without exceeding the specifications of the connected PSEs, or reduce its power consumption by limiting certain features and/or circuitry and/or modes of operation to keep within the power available budget.

For example, a typical PSE has power-limiting circuitry that reduces the PSE port voltage if a PD tries to take more than the maximum permissible power. The PSE's voltage detector circuit monitors the port voltage and will cut off the power to the PD if it tries to draw too much power.

Theoretically, with a zero length wire between a PSE and a PD, no power is lost as heat in the cable, and all the power available at the PSE's output port is available to the PD. Under the IEEE 802.3af standard, there may be up to 15.4 watts of electrical power available at the PSE output port. However, most PD devices limit themselves to only 12.95 watts of electrical power, subtracting the worst case cable power loss (2.45 watts) due to cable heating loss from the maximum power available (15.4 watts).

Embodiments of the invention enable PD devices to accurately measure the resistance of the cable and connector/s, and hence calculate the power lost due to heating of the cable and connector/s. If the actual power loss of a cable and connector is less than the worst case cable power loss (e.g. less than 2.45 watts), then the PD device can safely draw more than the typical limit of 12.95 watts of power without triggering the power-limiting circuitry of the PSE, provided the total power drawn by the PD including cable power losses is still less than the maximum limit of the PSE. In the case of the IEEE 802.3af standard, this may provide up to additional 2.45 watts of power per network connection to a device. This additional power can allow for improved PD performance, such as operating additional and/or more powerful wireless radio devices, faster processor speeds, or other devices, such as storage devices.

Figure 2:
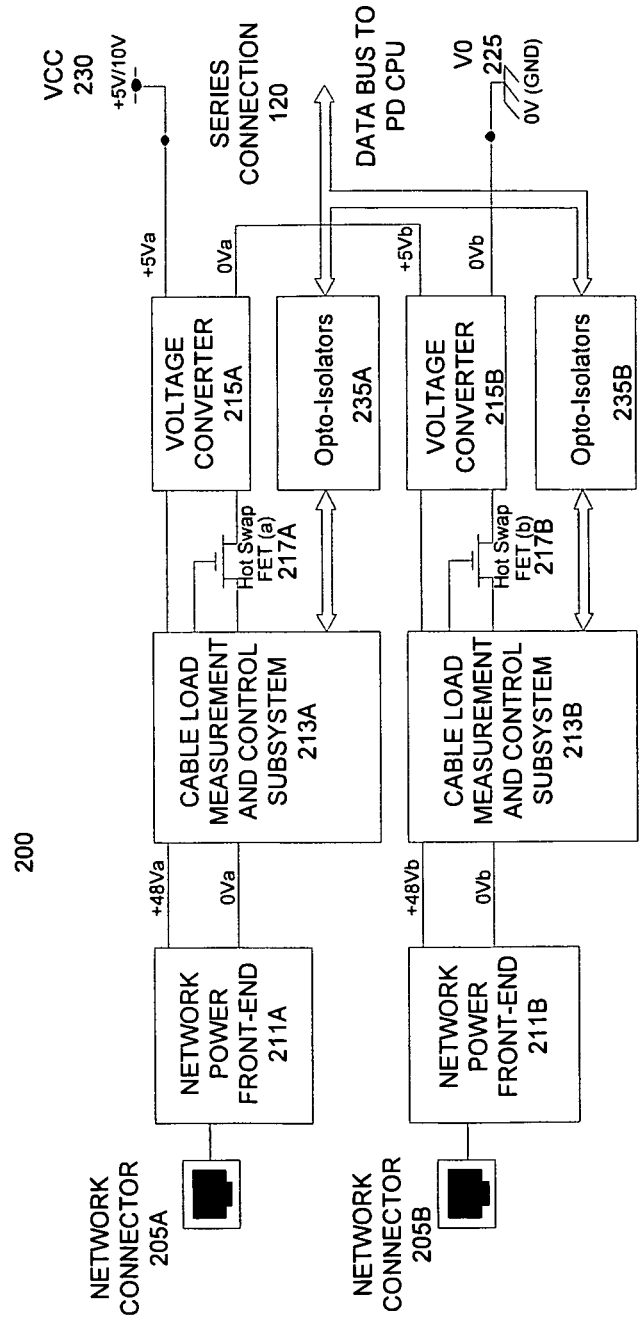
FIG. 2 illustrates a load-adjusting network power system according to an embodiment of the invention.

FIG. 2 illustrates a load-adjusting network power system 200 according to an embodiment of the invention. Load-adjusting network power system 200 operates similarly to stacked network power system 100 discussed above. Load-adjusting network power system 200 includes network communications ports 205*a* and 205*b*, power converters 215*a* and 215*b*, series power connection 120, and high and low supply voltage outputs 230 and 225, similar to their counterparts in stacked network power system 100.

Additionally, load-adjusting network power system 200 includes network power front-end circuits 211*a* and 211*b*, which perform the protocol and signaling functions required to receive power via the network connection. The load-adjusting network power system 200 also includes cable load measurement and control subsystems 213*a* and 213*b*, which measure the cable power losses associated with the network connections of network ports 205*a* and 205*b*, respectively.

As described in detail below, the cable load measurement and control subsystems 213*a* and 213*b* measure the cable power losses associated with the wires used to connect network ports 205*a* and 205*b* with PSE. This measurement is used to control the amount of power drawn by the receiving PD through the load-adjusting network power system 200. The cable load measurement and control subsystems 213*a* and 213*b* may operate in parallel independently of each other. In further embodiments, there is a separate cable load measurement and control subsystem for each network connector of the PD used to draw power from the network.

Control transistors 217*a* and 217*b* are used to decouple rest of the receiving PD from the power cable load measurement and control subsystem 213*a* and 213*b* during cable/connector power loss measurement.

Opto-isolators 235*a* and 235*b* allow the control logic of the PD to communicate with the cable load measurement and control subsystems 213*a* and 213*b* while maintaining electrical isolation.

Figure 3:
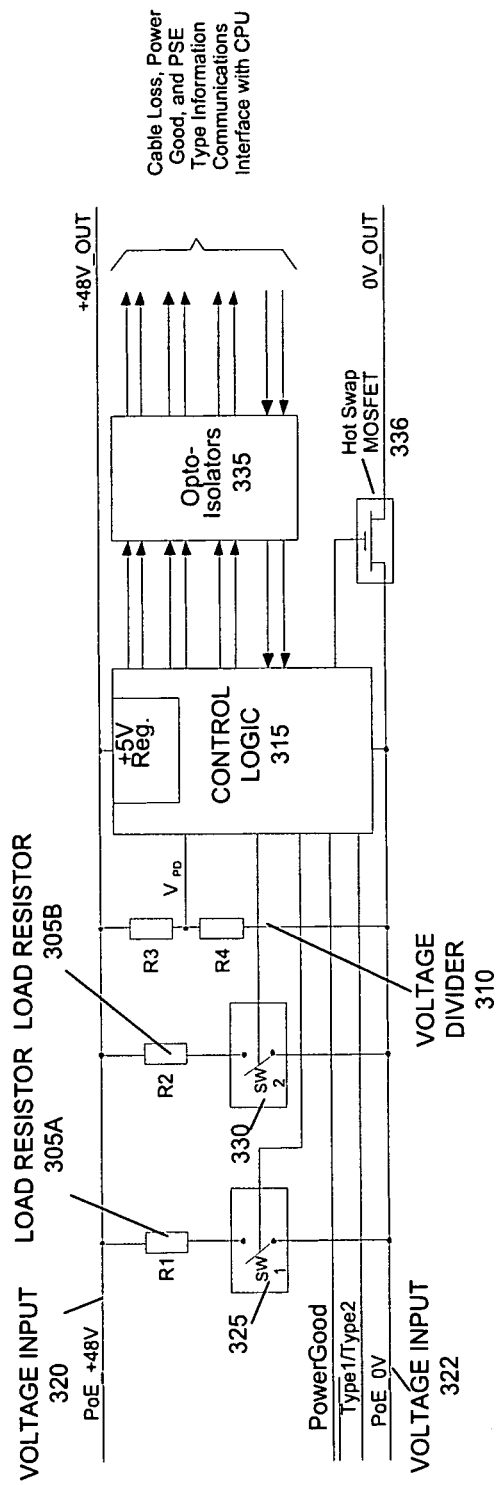
FIG. 3 illustrates a load testing and control subsystem of a load-adjusting network power system according to an embodiment of the invention.

FIG. 3 illustrates a cable load measurement and control subsystem 300 of a load-adjusting network power system according to an embodiment of the invention. Cable load measurement and control subsystem 300 includes two or more cable measuring load resistors 305 and a voltage divider 310. Control logic 315, which may be implemented as software or firmware of a general purpose microprocessor or microcontroller or as dedicated logic circuits, selectively connects load resistors such as load resistors 305*a* and 305*b* to a voltage input 320 connected with the wired network connection to measure the cable power losses associated with the network connection.

In an embodiment, the cable load measurement and control subsystem 300 is initialized after the network power front-end 211 has finished communicating with the PSE via a network power protocol. The control logic 315 ascertains the PSE type (such as IEEE802.3 type 1 or 2 PSE) based on the result of the network power front-end 211 exchange with the PSE, and passed to it as a logic signal. Upon completion of this initial communication, the PSE supplies the voltage input 320 with power, for example 48 volts. The PowerGood signal from the network power front-end 211 tells the control logic 315 to start its tests to ascertain the cable/connector resistance from the PSE to the PD.

An embodiment of the invention first measures the "open-circuit" voltage from the network power front-end 211, and then measures the cable loss for each port by first activating switch SW1 325, which puts load R1 305*a* across the voltage inputs 320 and 322. This load resistor 305*a* draws a known amount of power (for example in the region of 2 W to 5 W). After a brief settling period (to allow for the voltage to stabilize), the control logic 315 measures the voltage via voltage divider 310 (for example using an analog to digital converter) and stores the result. Then the control logic activates the switch SW2 330 (in addition to switch SW1 325). This puts load R2 305b in parallel with load R1 305a, such that the total load between voltage inputs 320 and 322 is for example in the region of 10 W. The control logic 315 then measures the voltage using voltage divider 310 and stores the result. In an embodiment, the control logic 315 determines the cable and connector power losses from these voltage measurements. In another embodiment, the control logic 315 communicates these measurements to another processor, such as the main processor of the PD, via opto-isolators 335 to determine the cable and connector power losses.

In an embodiment, given the two load resistance values R1 and R2, and the two under-load voltage readings V1 and V2, the equation for the cable/connector resistance, Rc, can be calculated using the equation:

$$Rc = \frac{(V2 - V1)R1 \cdot R2}{(V2 - V1)R2 + V2 \cdot R1}$$

In an embodiment, the control logic 315 actually measures a scaled down version ($V_{PD}$) of the voltage at input 320, so the measured values of the voltage, V1 and V2, will need to be pre-calculated using the equation:

$$V = \frac{V_{PD}(R3 + R4)}{R4}$$

Once the control logic has completed its load measurements, it de-activates both switches SW1 325 and SW2 330 and then activates the Hot Swap MOSFET switch 336 to apply power to the main system (PD).

In an embodiment, the main CPU of the PD will boot and then read the status and measurement data from one or more cable load measurement and control subsystems (for example two subsystems from a stacked power supply configuration) using any convenient serial or parallel communications interface protocol. An embodiment may use a simple serial bus protocol for this purpose (to minimize the number of opto-isolators required). Using the information obtained, the PD's CPU can make a quantified judgment as to what mode to operate in, such as how many interfaces to activate (e.g. one, two or three IEEE802.11 radio cards, one or two Gigabit Ethernet ports, etc.) based on the total amount of power available from the network communications ports. An operation mode can include configurations of components, such as processors, network interfaces, storage devices, wireless network interfaces, and optimizations thereof, to tailor the power consumption of the PD to the power capable of being supplied by one or more PSEs. In an embodiment, the CPU, processor, or other control logic of the PD may select one of a plurality of predetermined configurations of the PD based on the total amount of available power. In another embodiment, the CPU, processor, or other control logic of the PD dynamically determines a configuration of its components according to its desired performance specifications and the total amount of available power. In either of these embodiments, the power consumption of the selected operating configuration is less than or equal to the total available power. The power consumption of one or more operating configurations may be predetermined to assist the PD in selecting one of the operating configurations In a further embodiment, the control logic in one or more cable load measurement and control subsystems can continue to monitor the PowerGood signals and, should one of them fail (due to someone unplugging a cable, or PSE port/power failure, or other similar unplanned event), communicate this information to the main CPU of the PD. For example, the SPC may cause a non-maskable interrupt (NMI) to the main CPU via an opto-isolated connection to a CPU NMI port.

In another embodiment, the two switched resistor loads can be replaced by a single load transistor such as a MOSFET loading device with analog control using PWM or similar circuitry. Although this makes the circuit more complex to implement, it gives more flexibility in the measurement range and, if properly designed, could improve the load measurement accuracy. Careful attention will need to be paid to the protection of the active load device to ensure it cannot be turned ON for too long, causing thermal runaway or other failure condition/s. In an embodiment, the MOSFET loading device may be implemented within an integrated circuit including some or all of the other portions of the load testing circuit, for example the SPC, front-end, switched power supplies, and/or opto-isolators.

Although embodiments of the invention are discussed with reference to the IEEE 802.3af standard, embodiments of the invention are equally applicable to other network power specifications, such as the proposed IEEE 802.3at standard as well as proprietary network power standards. Additionally, embodiments of the invention are not limited to Ethernet network connections and may be utilized for any type of communication network where electrical power may be extracted via a network connection.

Figure 4:
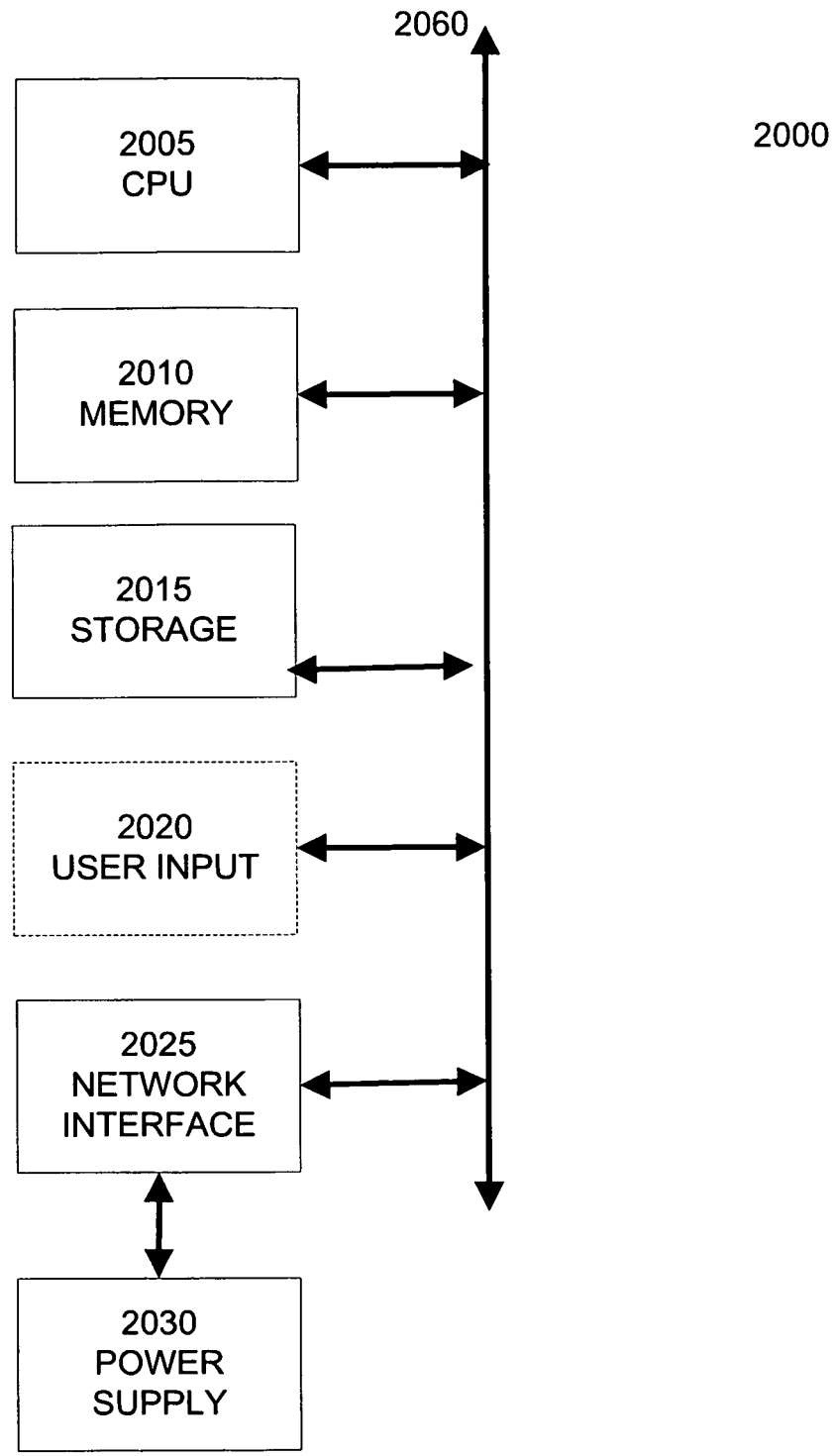
FIG. 4 illustrates an example computer system suitable for implementing an embodiment of the invention.

FIG. 4 illustrates an example computer system suitable for implementing an embodiment of the invention. FIG. 4 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, network traffic optimizers and accelerators, network attached storage devices, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include a wired networking interface, such as one or more Ethernet connections to communicate with other networking devices via local or wide-area networks. In a further embodiment, computer system 2000 may be capable of receiving some or all of its required electrical power via the network interface 2025, for example using a wired networking interface power over Ethernet system.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

In an embodiment, power supply 2030 is connected with network interface 2025 to draw electrical power for computer system 2000 from one or more wired network connections. Embodiments of power supply 2030 may include the cable load measurement and control subsystem as described above.

Further embodiments can be envisioned to one of ordinary skill in the art after reading the attached documents. For example, embodiments of the invention can be used with any number of network connections and may be added to any type of power supply in addition to the stacked network power supply illustrated above. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for determining an operating configuration of a network-powered device, the method comprising:
    measuring, by the network-powered device, a total network connection power loss associated with at least one wired network connection of the network-powered device, wherein a first network connection power loss and a second network connection power loss are measured in parallel; and
    determining, by the network-powered device, an operating configuration of the network-powered device based on the measured total network connection power loss;
    wherein the network-powered device receives power from a network power supply via the at least one wired network connection, and the operating configuration is determined from a set of operating configurations comprising:
    a first operating configuration that causes the network-powered device to operate at a first total power consumption less than a network power specification limit based on a worst-case network power loss; and
    a second operating configuration that causes the network-powered device to operate at a second total power consumption greater than the network power specification limit and less than a maximum power limit of the network power supply minus the total network power loss.

2. The method of claim 1, wherein:
    the first network connection power loss is associated with a first wired network connection of the network-powered device;
    the second network connection power loss is associated with a second wired network connection of the network-powered device; and
    the measuring the total network connection power loss comprises combining the first and second network connection power losses.

3. The method of claim 1, wherein determining the operating configuration comprises:
    determining a total amount of available power based on the measured total network connection power loss and the network power specification limit.

4. The method of claim 3, wherein determining the operating configuration comprises:
    determining the operating configuration of the network-powered device having a power consumption less than or equal to the total amount of available power.

5. The method of claim 1, wherein measuring the total network connection power loss comprises: communicating with a network power source using a network power protocol.

6. The method of claim 1, wherein measuring the total network connection power loss comprises:
    connecting the at least one wired network connection with a first electrical load;
    measuring a first voltage of the at least one wired network connection in response to the first electrical load; and
    determining a network connection resistance associated with the at least one wired network connection based on at least the first voltage.

7. The method of claim 6, wherein measuring the total network connection power loss comprises:
    connecting the at least one wired network connection with a second electrical load;
    measuring a second voltage of the at least one wired network connection in response to the second electrical load; and
    determining the network connection resistance associated with the at least one wired network connection based on at least the first voltage and the second voltage.

8. The method of claim 6, wherein the first electrical load includes a resistor.

9. The method of claim 6, wherein the first electrical load includes a load transistor.

10. The method of claim 1, wherein the determined operating configuration of the network-powered device comprises: a wireless network interface configuration of the network-powered device.

11. The method of claim 1, wherein the determined operating configuration of the network-powered device comprises: a wired network interface configuration of the network-powered device.

12. The method of claim 1, wherein the determined operating configuration of the network-powered device comprises: a processor configuration of the network-powered device.

13. A network-powered device comprising:
- a first wired network connection adapted to receive power from a network power source;
- at least one cable load measuring subsystem connected with the first wired network connection and adapted to measure at least a first voltage indicative of a network connection power loss associated with the first wired network connection;
- a first control logic adapted to determine the network connection power loss associated with the first wired network connection, wherein determining a network power loss is based on measuring a first network connection power loss and a second network connection power loss in parallel; and
- a second control logic adapted to determine an operating configuration of the network-powered device based on the network power loss;
- wherein the operating configuration is determined from a set of operating configurations comprising:
  - a first operating configuration that causes the network-powered device to operate at a first total power consumption less than a network power specification limit based on a worst-case network power loss; and
  - a second operating configuration that causes the network-powered device to operate at a second total power consumption greater than the network power specification limit and less than a maximum power limit of the network power source minus the network power loss.

14. The network-powered device of claim 13, wherein the first control logic includes logic adapted to determine a total amount of available power based on the network connection power loss and the network power specification limit.

15. The network-powered device of claim 14, wherein the first control logic includes logic adapted to determine the operating configuration of the network-powered device having a power consumption less than or equal to the total amount of available power.

16. The network-powered device of claim 13, wherein the at least one cable load measuring subsystem includes:
- a first electrical load adapted to be selectively connected with the first wired network connection by the first control logic; and
- a first voltage measuring circuit adapted to measure a first voltage responsive to the first electrical load.

17. The network-powered device of claim 16, wherein the first electrical load includes a resistor.

18. The network-powered device of claim 16, wherein the first electrical load includes a load transistor.

19. The network-powered device of claim 13, wherein the determined operating configuration of the network-powered device comprises: a wireless network interface configuration of the network-powered device.

20. The network-powered device of claim 13, wherein the determined operating configuration of the network-powered device comprises: a wired network interface configuration of the network-powered device.

21. The network-powered device of claim 13, wherein the determined operating configuration of the network-powered device comprises: a processor configuration of the network-powered device.

* * * * *